US009961657B2

(12) United States Patent
Xiong et al.

(10) Patent No.: US 9,961,657 B2
(45) Date of Patent: May 1, 2018

(54) SYSTEM AND METHOD OF MTC DEVICE OPERATIONS (71) Applicant: Intel IP Corporation, Santa Clara, CA (US)

(72) Inventors: Gang Xiong, Beaverton, OR (US); Seunghee Han, Cupertino, CA (US); Debdeep Chatterjee, Santa Clara, CA (US); Jong-Kae Fwu, Sunnyvale, CA (US); Hong He, Beijing (CN); Alexei Davydov, Nizhny Novgorod (RU)

(73) Assignee: Intel IP Corporation, Santa Clara, CA (US)

( * ) Notice: Subject to any disclaimer, the term of this patent is extended or adjusted under 35 U.S.C. 154(b) by 168 days.

(21) Appl. No.: 14/711,847

(22) Filed: May 14, 2015

(65) Prior Publication Data

US 2016/0095076 A1 Mar. 31, 2016

Related U.S. Application Data (60) Provisional application No. 62/055,434, filed on Sep. 25, 2014.

(51) Int. Cl.
*H04J 3/00* (2006.01)
*H04W 56/00* (2009.01)
(Continued)

(52) U.S. Cl.
CPC ............ *H04W 56/002* (2013.01); *H04L 1/08* (2013.01); *H04L 5/0053* (2013.01);
(Continued)

(58) Field of Classification Search
CPC .......................... H04W 56/002; H04W 4/005
(Continued)

(56) References Cited

U.S. PATENT DOCUMENTS

2014/0044056 A1 2/2014 Chen et al.
2014/0071957 A1* 3/2014 Xu .................... H04W 52/0219
370/336
(Continued)

FOREIGN PATENT DOCUMENTS

EP 2624644 A1 8/2013
WO WO-2014069944 A1 5/2014
(Continued)

OTHER PUBLICATIONS

"International Application Serial No. PCT/US2015/046548, International Preliminary Report on Patentability dated Apr. 6, 2017", 11 pgs.
(Continued)

*Primary Examiner* — Samina Choudhry
(74) *Attorney, Agent, or Firm* — Schwegman Lundberg & Woessner, P.A.

(57) ABSTRACT

An eNodeB (eNB), user equipment (UE) and method for operating in enhanced coverage (EC) modes are generally described. The UE may receive one or more physical broadcast channel (PBCH) signals, dependent on whether the UE is in a normal coverage mode or in one of the EC modes. The PBCH signal may be combined to form a combined PBCH signal, when the UE is in an EC mode, and decoded to determine one of a plurality of sets of resource regions associated different EC modes for communication with the eNB. The signal may be scrambled using a Radio Network Temporary Identifier (RNTI) dependent on at least one of a signal type of the control signal and the EC mode. Paging and the system information block (SIB) signals in a Physical Downlink Shared Channel (PDSCH) may be decoded without decoding a physical downlink control channel (PDCCH) signal associated with the PDSCH.

27 Claims, 4 Drawing Sheets (51) Int. Cl.
  *H04W 4/00* (2018.01)
  *H04W 72/00* (2009.01)
  *H04W 72/04* (2009.01)
  *H04L 5/00* (2006.01)
  *H04L 1/08* (2006.01)

(52) U.S. Cl.
  CPC ......... *H04W 4/005* (2013.01); *H04W 72/005* (2013.01); *H04W 72/042* (2013.01)

(58) Field of Classification Search
  USPC .......................................................... 370/336
  See application file for complete search history.

(56) References Cited

U.S. PATENT DOCUMENTS

| 2014/0098761 | A1* | 4/2014 | Lee ..................... H04W 74/006 370/329 |
| 2014/0220970 | A1 | 8/2014 | Yang et al. |
| 2015/0181575 | A1* | 6/2015 | Ng ........................ H04L 5/0092 370/329 |
| 2015/0223149 | A1* | 8/2015 | Liu ....................... H04W 48/12 370/252 |
| 2015/0296518 | A1 | 10/2015 | Yi et al. |

FOREIGN PATENT DOCUMENTS

| WO | WO-2014109684 A1 | 7/2014 |
| WO | WO-2014110804 A1 | 7/2014 |
| WO | WO-2016048519 A1 | 3/2016 |

OTHER PUBLICATIONS

"International Application Serial No. PCT/US2015/046548, International Search Report dated Dec. 28, 2015", 3 pgs.

"International Application Serial No. PCT/US2015/046548, Written Opinion dated Dec. 28, 2015", 9 pgs.

Mediatek, et al., "On the need of PDCCH for SIB, RAR and Paging", R1-140239, 3GPP TSG-RAN WG1 Meeting #76, Prague; Czech Republic, (2014).

"European Application Serial No. 15844631.0, Extended European Search Report dated Feb. 19, 2018", 14 pgs.

Huawei, et al., "Coverage enhancement for physical channels and Signals for low-cost MTC", 3GPP Draft; R1-130017, 3rd Generation Partnership Project (3GPP), Mobile Competence Centre; 650, Route Des Lucioles; F-06921 Sophia-Antipolis Cedex; France, vol. RAN WG1, No. St. Julian, Retrieved from the Internet: <URL:http://www.3gpp.org/ftp/tsg_ran/WG1_RL1/TSGR1_72/Docs/> [retrieved on Jan. 19, 2013], (Jan. 19, 2013).

ZTE, "Coverage Enhancement of Physical Broadcast Channel and SIB Transmission", R1-134302, 3GPP TSG RAN WG1 Meeting #74bis, Guangzhou, China [Online] retrieved from the internet: <(http://www.3gpp.org/ftp/tsg_ran/wg1_rl1/TSGR1_74b/Docs/R1-134302.zip)>, (Oct. 2013), 1-7.

* cited by examiner

SYSTEM AND METHOD OF MTC DEVICE OPERATIONS

PRIORITY CLAIM

This application claims the benefit of priority to U.S. Provisional Patent Application Ser. No. 62/055,434, filed Sep. 25, 2014, and entitled "SYSTEM AND METHOD ASSOCIATED WITH EFFICIENT OPERATIONS FOR MTC APPLICATION," which is incorporated herein by reference in its entirety.

TECHNICAL FIELD

Embodiments pertain to wireless communications. Some embodiments relate to cellular communication networks including LTE networks. Some embodiments relate to enhanced coverage communication.

BACKGROUND

With the increase in different types of devices communicating over networks to servers and other computing devices, usage of third generation long term evolution (3GPP LTE) systems has increased. In particular, both typical user equipment (UE) such as cell phones and Machine Type Communications (MTC) UEs currently use 3GPP LTE system. MTC UEs pose a particular challenge as they are less computationally powerful and have less power for communication. Moreover, many MTC UEs are configured to remain essentially indefinitely in a single location. Examples of such MTC UEs include sensors (e.g., sensing environmental conditions) or microcontrollers in appliances or vending machines. In some circumstances, the MTC UEs may be located in areas where there is little to no coverage, such as inside buildings, or in isolated geographical areas. Unfortunately, in a number of cases, MTC UEs do not have sufficient power for communications with the nearest serving base station (enhanced Node B (eNB)) with which they communicate to satisfy normal Radio Link Control (RLC) protocol requirements within the current 3GPP standard. The RLC protocols may also cause similar problems for non-stationary wireless UEs, such as mobile phones, that are disposed in a network area with poor coverage, i.e., one in which the link budget is several dB below typical network values.

Transmission power may not be able to be increased either by a UE or eNB in situations in which UEs are in such areas. To achieve a particular coverage extension target and obtain additional dB in link budget, signals may be repeatedly transmitted from the transmitting device (UE or eNB) over an extended period to accumulate energy at the receiving device. It would be desirable for the appropriate extended period to be employed to enable the network and UE to communicate.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION OF THE INVENTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
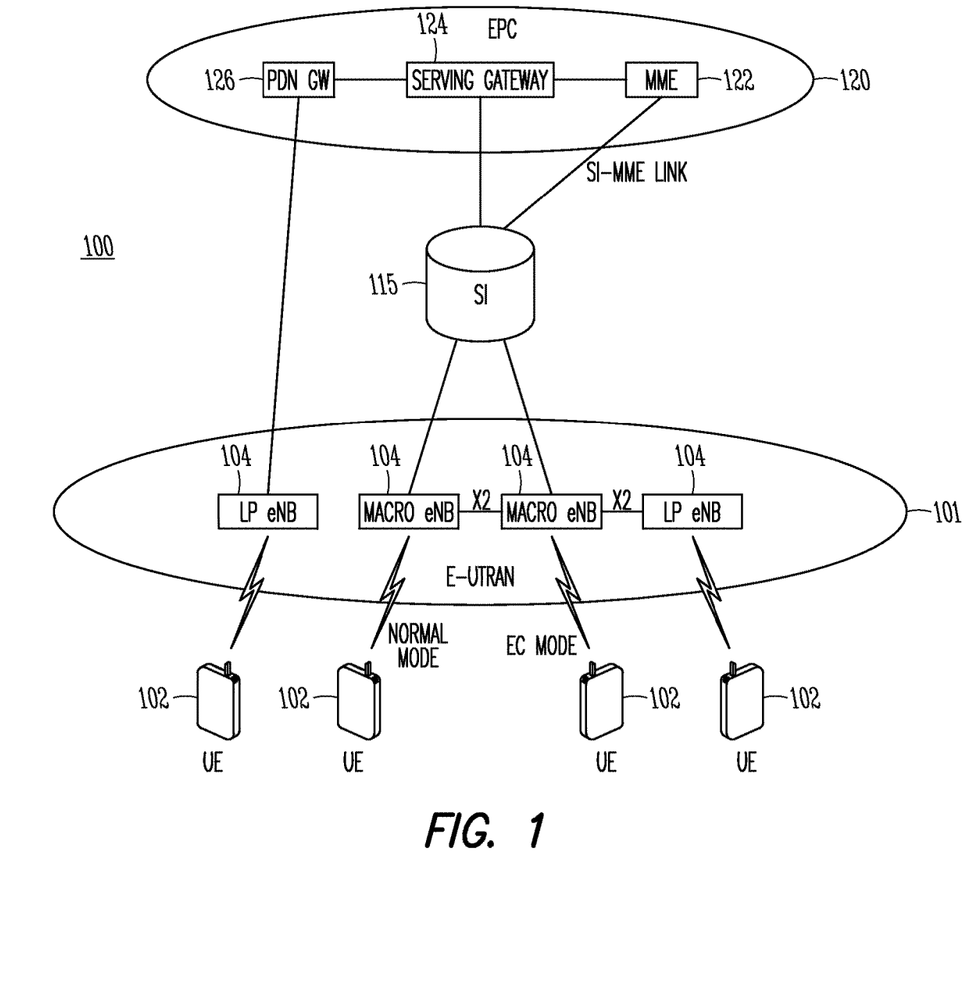
FIG. 1 is a functional diagram of a 3GPP network in accordance with some embodiments.

FIG. 1 is a functional diagram of a 3GPP network in accordance with some embodiments. The network may comprise a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity sake, only a portion of the core network 120, as well as the RAN 100, is shown.

The core network 120 includes mobility management entity (MME) 122, serving gateway (serving GW) 124, and packet data network gateway (PDN GW) 126. The RAN 100 includes Evolved Node-B's (eNBs) 104 (which may operate as base stations) for communicating with UE 102. The eNBs 104 may include macro eNBs and low power (LP) eNBs.

The MME is similar in function to the control plane of legacy Serving GPRS Support Nodes (SGSN). The MME manages mobility aspects in access such as gateway selection and tracking area list management. The serving GW 124 terminates the interface toward the RAN 100, and routes traffic packets (such as data packets or voice packets) between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates a SGi interface toward the packet data network (PDN). The PDN GW 126 routes traffic packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. The eNBs 104 may communicate both with UEs 102 in a normal coverage mode and UEs 104 in one or more enhanced coverage modes. In some embodiments, an eNB 104 may fulfill various logical functions for the RAN 100 including but not limited to RNC (radio network controller functions) such as radio bearer management, uplink and downlink dynamic radio resource management and traffic packet scheduling, and mobility management. In accordance with embodiments, UEs 102 may be configured to communicate OFDM communication signals with an eNB 104 over a multicarrier communication channel in accordance with an OFDMA communication technique. The OFDM signals may comprise a plurality of orthogonal subcarriers. Other technologies may also be used, such as Non-Orthogonal Multiple Access (NOMA), Code Division Multiple Access (CDMA), and Orthogonal Frequency-Division Multiple Access (OFDMA).

The S1 interface 115 is the interface that separates the RAN 100 and the EPC 120. It is split into two parts: the S1-U, which carries traffic packets between the eNBs 104 and the serving GW 124, and the S1-MME, which is a signaling interface between the eNBs 104 and the MME 122.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a downlink resource grid may be used for downlink transmissions from an eNB 104 to a UE 102, while uplink transmission from the UE 102 to the eNB 104 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements. A resource block represents the smallest quanta of resources that can be allocated. A physical resource block may be an allocation of a specific number of subcarriers for a predetermined amount of time. There are several different physical downlink channels that are conveyed using such resource blocks.

Figure 2:
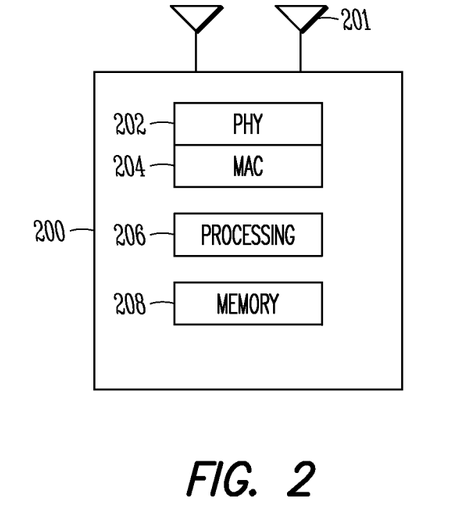
FIG. 2 is a block diagram of a 3GPP device in accordance with some embodiments.

FIG. 2 is a functional diagram of a 3GPP device in accordance with some embodiments. The device may be a UE or eNB, for example. In some embodiments, the eNB may be a stationary non-mobile device. The 3GPP device 200 may include physical layer circuitry 202 for transmitting and receiving signals using one or more antennas 201. The 3GPP device 200 may also include medium access control layer (MAC) circuitry 204 for controlling access to the wireless medium. The 3GPP device 200 may also include processing circuitry 206 and memory 208 arranged to perform the operations described herein.

In some embodiments, mobile devices or other devices described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the mobile device or other device can be a UE 102 or eNB 104 configured to operate in accordance with 3GPP standards. In some embodiments, the mobile device or other device may be configured to operate according to other protocols or standards, including IEEE 802.11 or other IEEE standards. In some embodiments, the mobile device or other device may include one or more of a keyboard, a display, a non-volatile memory port, multiple antennas, a graphics processor, an application processor, speakers, and other mobile device elements. The display may be an LCD screen including a touch screen.

The antennas 201 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 201 may be effectively separated to take advantage of spatial diversity and the different channel characteristics that may result.

Although the 3GPP device 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

The term "machine readable medium" may include a single medium or multiple media (e.g., a centralized or distributed database, and/or associated caches and servers) configured to store one or more instructions. The term "machine readable medium" may include any medium that is capable of storing, encoding, or carrying instructions for execution by the 3GPPP device 200 and that cause it to perform any one or more of the techniques of the present disclosure, or that is capable of storing, encoding or carrying data structures used by or associated with such instructions. The term "transmission medium" shall be taken to include any intangible medium that is capable of storing, encoding or carrying instructions for execution, and includes digital or analog communications signals or other intangible medium to facilitate communication of such software.

As described above, there are a number of different types of UEs that may use an enhanced coverage mode. These UEs may include a normal UE (e.g., a smartphone or the like), a machine-to-machine (M2M) UE or a stationary wireless UE (i.e., a UE that remains indefinitely in a single location) using MTC. At least some of the UEs or the serving eNB are unable to increase transmission power in an enhanced coverage area, either because the UE is intrinsically power limited or limited by the eNB, e.g., to reduce interference. In this case, the UE may enter an enhanced coverage mode when situated in locations in which the link budget to the nearest serving base station is worse than a typical link budget value in the network and additional link budget is to be obtained without increasing transmission power.

To increase signal power at the receiver without increasing the transmission power, the same packet data may be repeatedly transmitted by the transmitter. The transmitter may be either of the UE (uplink communications) or eNB (downlink communications), while the receiver may be the other of the UE (downlink communications) or eNB (uplink communications). The UE may determine whether additional link budget is desired, as well as how much additional link budget is desired. In some embodiments, the additional link budget may include multiple discrete levels, e.g., up to about 5 dB, up to about 10 dB, up to about 15 dB and up to about 20 dB. In response to determining how much additional link budget is desired, the UE may implement a different enhanced coverage mode. In some embodiments, different enhanced coverage modes may be available dependent on the desired amount of additional link budget.

As different amounts of additional link budget may be desired, the different enhanced coverage modes may correspond to different sets of resource regions. The different sets of resource regions may be separated temporally (e.g., in different slots) to provide different amounts of repetition of the same (control or data) signal. In one example, to obtain the link budget, packets transmitted between the UE and eNB may be repeated a large number (>100) of times. By permitting the repetition level for each physical channel transmission to be UE specific depending on the desired enhanced coverage level, excessive radio resource waste and unnecessary UE power consumption may be avoided.

Moreover, to further reduce cost and power consumption, the operating bandwidth of MTC UEs may be reduced, e.g., to 1.4 MHz, for both control and data channels. This may permit a resource region of limited resources (e.g., in frequency) to be used in communications between the MTC UEs and the eNB. Such a region may be referred to herein as an MTC region. However, if a large number of MTC UEs are deployed for specific services within a single cell, a single MTC region with 1.4 MHz bandwidth may not be sufficient to service the MTC UEs. Thus, the different enhanced coverage modes may correspond to different sets of MTC regions, and, dependent on the UE, may correspond to different resource regions within a particular slot.

In one example, a physical broadcast channel (PBCH) signal may be transmitted from the eNB to an MTC UE. The PBCH signal may contain, in a master information block (MIB) signal, a limited number of parameters that may be used for initial access of the eNB, such as downlink system bandwidth (typically 20 MHz), Physical Hybrid ARQ Indicator Channel structure, and most significant eight-bits of the System Frame Number. The PBCH may occupy the center 72 subcarriers (6 central resource blocks) of the first 4 OFDM symbols of second slot in the first subframe of every radio frame. PBCH signal transmission may be spread over four 10 ms frames (over subframe 0) to span a 40 ms period. The modulation scheme of the PBCH signal may be Quadrature Phase Shift Keying (QPSK) and the information bits coded and rate matched—the bits are then scrambled using a scrambling sequence specific to the cell to prevent confusion with data from other cells. The PBCH signal transmission may have 14 information bits, 10 spare bits, and 16 CRC bits.

Although in some embodiments, the PBCH signal is transmitted only in the first subframe of each frame, in other embodiments, the PBCH signal may be retransmitted over one or more other subframes during the 40 ms (4 frame) period. For example, in some embodiments, the PBCH signal may be additionally transmitted in the $5^{th}$ subframe of every odd frame of the 4 frame period. In some embodiments, the PBCH signal may be additionally transmitted in one or more additional subframes of every frame, in which the subframe(s) may be the same among the 4 frames or may differ among at least one of the 4 frames. In some embodiments, the PBCH signal repetition occurs every 4 frames, while in other embodiments, repetition may switch dynamically on and off or may have a predetermined pattern in different sets of 4 frames. Typically, in some embodiments, the eNB may avoid transmitting user data and MIB data in the same PRBs. The additional PBCH signals may be transmitted in MTC regions, as described above.

In some embodiments, the MTC regions may include sets of MTC regions. The sets of MTC regions may include a set of MTC regions allocated for MTC UEs in normal coverage mode with the remaining sets of MTC regions allocated for MTC UEs in different enhanced coverage modes. Specifically, in some embodiments, each of the remaining sets of MTC regions may be allocated for MTC UEs in a different enhanced coverage mode. In some embodiments, the MTC regions may be used for transmission by the eNB of control signals, such as paging signals, to the UE. As described in more detail below, the control signals in the MTC regions for MTC UEs in enhanced coverage mode may have different characteristics or identifiers than corresponding control signals for MTC UEs in normal coverage mode.

Figure 3A:
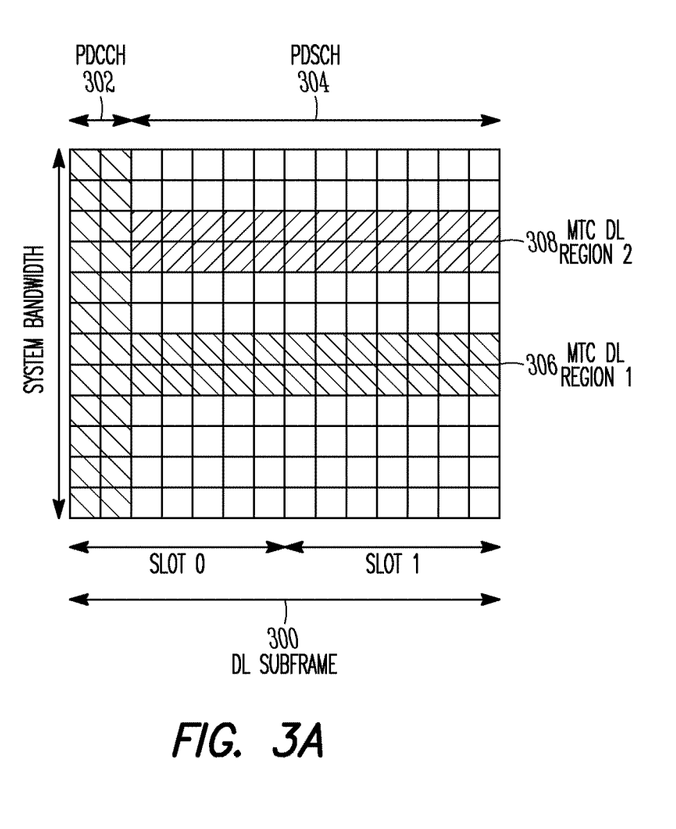
FIGS. 3A and 3B illustrate an uplink and downlink subframe in accordance with some embodiments.
Figure 3B:
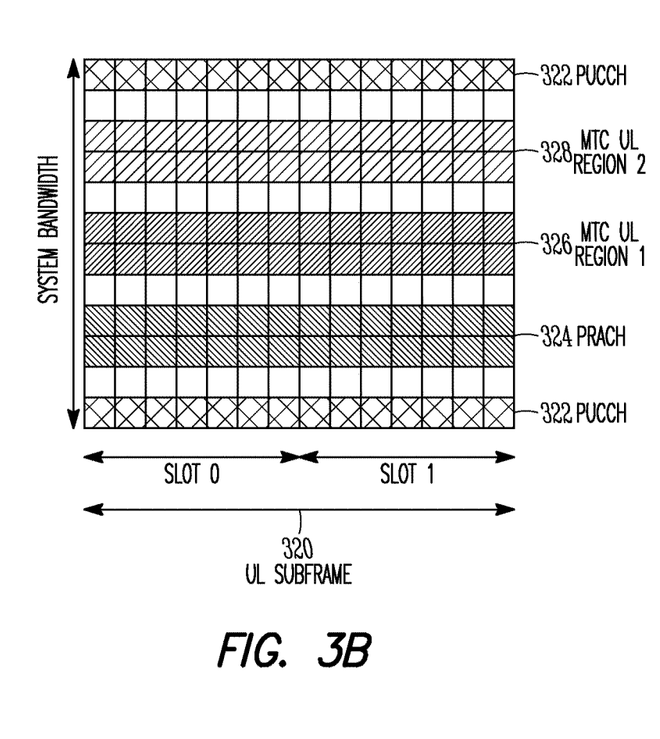

FIGS. 3A and 3B illustrate an uplink and downlink subframe in accordance with some embodiments. As shown in FIG. 3A, the downlink subframe 300 may contain a Physical Downlink Control Channel (PDCCH) 302 and a Physical Downlink Shared Channel (PDSCH) 304. The PDCCH 302 may carry scheduling information including downlink resource scheduling, uplink power control instructions, uplink resource grant, and an indication for paging or system information. The PDCCH 302 may also contain Downlink Control Information (DCI) in one of a number of formats that carries control information for a particular UE or group of UEs and tells the UE how to find and decode data, transmitted on PDSCH 304 in the same subframe, from the resource grid. The DCI format may provide details such as number of resource blocks, resource allocation type, modulation scheme, transport block, redundancy version, coding rate etc. The PDSCH 304 may contain data for one or more UEs and may be allocated to UEs on a dynamic and opportunistic basis. The PDSCH 304 may also be used to transmit broadcast information not transmitted on the PBCH, which may include System Information Blocks (SIB) and paging messages. The PDSCH 304 may contain one or more MTC downlink regions. In some embodiments, the resource used by the paging signal or SIB in the PDSCH 304 is indicated in the PDCCH 302 signal associated with the PDSCH 304.

Although FIG. 3A illustrates two MTC regions of limited bandwidth, e.g., 1.4 MHz, a greater number of MTC regions of the same bandwidth or of different bandwidths may be present in a PDSCH 304 of a particular subframe. The configuration of each MTC region may be broadcast in the MIB via the PBCH and may include a limited set of bitmaps along with the MTC occasion and periodicity. As shown in FIG. 3A, MTC region 1 306 may occupy the central six PRBs of the subframe. In one embodiment, MTC region 1 306 may be allocated for MTC UEs in the normal coverage mode while MTC region 2 308 may be allocated for MTC UEs in the enhanced coverage mode. In other embodiments, other arrangements may exist, e.g., MTC region 1 306 may be allocated for MTC UEs in the enhanced coverage mode while MTC region 2 308 may be allocated for MTC UEs in the normal coverage mode.

The uplink subframe 320 of FIG. 3B may contain a Physical Uplink Control Channel (PUCCH) 322, a Physical Random Access Channel (PRACH) 324 and at least one MTC region 326, 328. The PUCCH 322 may provide a various control signals including HARQ acknowledgment/non-acknowledgement, one or more channel quality indicators (CQI), MIMO feedback (Rank Indicator, RI; Precoding Matrix Indicator, PMI) and scheduling requests for uplink transmission. The PUCCH 322 may transmit in a frequency region at the edge of the system bandwidth and may comprise one RB per transmission at one end of the system bandwidth followed by a RB in the following slot at the opposite end of the channel spectrum, thus making use of frequency diversity. A PUCCH 322 Control Region may comprise every two RBs. BPSK or QPSK may be used for modulation of PUCCH information. The PRACH 324 may be used for random access functions and made up from two sequences: a cyclic prefix and a guard period. The preamble sequence may be repeated to enable the eNB to decode the preamble when link conditions are poor. Although FIG. 3B illustrates two MTC regions of limited bandwidth, a greater number of MTC regions of the same bandwidth or of different bandwidths may be present in a particular subframe. Note that a Physical Uplink Shared Channel (PUSCH), which is the uplink counterpart of the PDSCH 304, is not shown in FIG. 3B.

As shown in FIGS. 3A and 3B, two MTC regions 326, 328 may be allocated by the eNB. In some embodiments, the eNB may automatically allocate the regions for the various types of signals and for the various types of modes and transmit the signals in the appropriate regions. In some embodiments, the eNB may determine whether at least one UE served by the eNB is operating a single enhanced coverage mode or whether a plurality of UEs are operating in a plurality of enhanced coverage modes associated with a different coverage extension target. The eNB may obtain the mode information from PRACH transmissions sent from UEs to the eNB. In response to determining that multiple UEs served by the eNB are operating in different EC modes, the eNB may allocate different sets of resources for a particular signal, where each set of resources corresponds to a different one of the enhanced coverage modes. In some embodiments, one MTC region 326 (328) may be allocated for a UE in normal coverage mode while the other MTC region shown 328 (326) may be allocated for MTC UEs in an enhanced coverage mode. In another embodiment, 4 MTC regions may be allocated: one MTC region may be allocated for a UE in normal coverage mode, while the others may be allocated for MTC UEs in an enhanced coverage mode with a coverage enhancement target of 5 dB, 10 dB and 15 dB. The partitioning of resources in this manner may allow efficient operation for MTC UEs in enhanced coverage modes while minimizing the impact on MTC UEs in normal coverage mode.

In some embodiments, the number of MTC regions in uplink and downlink subframes 300, 320 may be independent. As shown in FIGS. 3A and 3B, for example, two MTC regions 306, 308, 326, 328 may be allocated for each of the uplink and downlink subframes 300, 320. In another example, however, two MTC regions may be allocated in the downlink subframe 300 while a single MTC region may be allocated in the uplink subframe 320. The independency of the MTC regions may help to adjust the uplink and downlink traffic independently, depending on the number of MTC UEs deployed in the cell, as well as the deployment locations, and the specific applications used by the MTC UEs. For example, as there may typically be more downlink traffic than uplink traffic, a larger number of MTC regions may be provided in the downlink subframes than in the uplink subframes.

In some embodiments, multiple MTC regions may be allocated to MTC UEs operating in a normal coverage mode. In this case, the MTC UEs operating in the normal coverage mode may randomly select among the normal coverage mode MTC regions. In other embodiments, the MTC UEs operating in the normal coverage mode may be preassigned one of the normal coverage mode MTC regions. Similarly, when multiple MTC regions are allocated to MTC UEs operating in an enhanced coverage mode, the MTC UEs operating in the enhanced coverage mode may randomly select among, or be preassigned, the enhanced coverage mode MTC regions. As shown in FIGS. 3A and 3B, multiple MTC regions 306, 308, 326, 328 are multiplexed in the frequency domain (i.e., two MTC regions span different subchannels and overlap in time). In some embodiments, the MTC regions may instead or in addition be multiplexed in the time domain.

The MTC regions may be used to provide data and/or control signals in various embodiments. The MTC UE may first attach to the eNB and discover specifics about the MTC regions, independent of whether the MTC UE is in normal mode or enhanced mode. In some embodiments, for an MTC UE in normal coverage mode, the MTC UE may first detect the primary and secondary synchronization signals and subsequently decode the PBCH. As mentioned above, the PBCH (as well as the primary and secondary synchronization signals) may be in the central 6 PRBs. As the PBCH may contain the information regarding specifics of the MTC regions, once the PBCH has been decoded, the MTC UE may thus obtain the location in time and frequency of the uplink and downlink normal coverage MTC regions. MTC UEs in a normal mode may continue to read a legacy SIB to obtain system information to access the network. Subsequently, the MTC UEs may communicate with the eNB within both the uplink and downlink MTC regions.

In some embodiments, the process of initial access and synchronization for an MTC UE in enhanced coverage mode may be similar to that above. The MTC UE in enhanced coverage mode may detect the normal primary and secondary synchronization signal over an extended period and subsequently decode the enhanced PBCH. In some embodiments, the enhanced primary and secondary synchronization signal and PBCH are transmitted in the central 6 PRBs, similar to the existing standard. MTC UEs in enhanced mode may employ a longer detection time to acquire the desired signal strength (link budget) to permit the MTC UEs to decode the primary and secondary synchronization signal and PBCH. Similar to the above, the PBCH (as well as the primary and secondary synchronization signals) may be in the central 6 PRBs. The MTC UE may determine that it is in an enhanced coverage mode (as well as which enhanced coverage mode) dependent on at least one of a number of primary and/or secondary synchronization signals transmitted by the eNB that are to be combined to form a combined synchronization signal having the predetermined link budget or otherwise enable successful decoding of the synchronization signal, a number of PBCH signals that are to be combined to form a combined PBCH signal having the predetermined link budget, and a measurement of Reference Signal Received Power (RSRP). The MTC UE in enhanced coverage mode may subsequently communicate with the eNB via MTC regions configured for enhanced coverage mode MTC UEs. MTC UEs in an enhanced coverage mode may continue to read an enhanced SIB to obtain system information to access the network. Subsequently, the MTC UEs in enhanced coverage mode may communicate with the eNB within both the uplink and downlink MTC regions.

In some embodiments, in addition to the normal primary and secondary synchronization signal and PBCH, an enhanced version of one or more of these signals may be transmitted by the eNB in the predefined MTC regions. The MTC UE in enhanced coverage mode may detect such a primary and secondary synchronization signal over an extended period and subsequently decode the enhanced PBCH. The normal and enhanced primary and secondary synchronization signals may have the same or different designs. In embodiments in which enhanced primary and secondary synchronization signals are present in a predefined one (or more) of the MTC regions, the MTC UEs in enhanced coverage mode may initially attempt to detect the normal primary and secondary synchronization signals in the central 6 PRBs and/or the enhanced primary and secondary synchronization signals in the MTC region. After detecting either or both the normal and enhanced primary and secondary synchronization signals, the MTC UEs in enhanced coverage mode may then decode an enhanced PBCH present in the predefined MTC region. The MTC UE may be determined to be in an enhanced coverage mode based on one or more of the detection time used to combine the primary and/or secondary synchronization signals to form a combined synchronization signal having the predetermined link budget, whether the PBCH signal has been successfully decoded, and a measurement of RSRP.

In further embodiments, as mentioned above, one or more control signals transmitted by the eNB that have an enhanced coverage mode version transmitted in the predetermined MTC region may have a particular identifier that differentiates the enhanced coverage mode control signal from the normal coverage mode control signal. In some embodiments, the control signals include paging (and system information change notification) signals and/or broadcast system information (SI) signals. In some embodiments, the identifier may be a Radio Network Temporary Identifier (RNTI), used to scramble the cyclic redundancy code (CRC) of the corresponding signal. The RNTI allows the PDCCH (providing a common search space and a dedicated search space for one or more UEs) and enhanced PDCCH (EPDCCH) (providing a dedicated search space for one or more UEs) to be used. In some embodiments, the RNTI may be dependent on the type of control signal (e.g., paging or SI signal). In some embodiments, the RNTI may instead or in addition be dependent on the enhanced coverage mode. The one or more RNTIs used for the various control signals and enhanced coverage modes may differ from RNTIs used for control signals for normal coverage mode MTC UEs. For example, the hexadecimal values of the CE (coverage enhancement) RNTIs may be FFFB and FFFC for the paging signal (CE-P-RNTI) and SI signal (CE-SI-RNTI) and FFFD, FFFE, FFFF for normal coverage mode paging, SI and Multicast Control Channel (MCCH) Information change notification signals.

In one example, use of the enhanced coverage mode RNTI of the control signal (CE-SI-RNTI or CE-P-RNTI) may permit an MTC UE in a coverage enhanced mode to decode the PDCCH or EPDCCH and the corresponding PDSCH, each of whose CRCs has been scrambled by the CE-SI-RNTI. In some embodiments, the PDSCH may be scrambled using the RNTI as a seed in addition to using at least one of the physical cell identification of the cell serving the MTC UE and an index of the MTC region in which the PDSCH is transmitted. Depending on the control signal, the PDSCH may contain different data: for example, for an SI signal, scrambled using the CE-SI-RNTI, the PDSCH may contain SIB data, while for a paging signal, scrambled using the CE-P-RNTI, the PDSCH may contain paging data. In some embodiments, however, the coverage enhanced mode MTC UE may not use the PDCCH to determine whether or not to decode the PDSCH. In such cases, the coverage enhanced mode MTC UE may instead have preprogrammed or otherwise indicated a predetermined set of resources (time and frequency locations) of a PDSCH that has been scrambled using the appropriate RNTI (CE-SI-RNTI or CE-P-RNTI).

In some embodiments, additional P-RNTIs and/or SI-RNTIs can be defined for MTC coverage enhancement, depending on specific coverage enhancement levels (or targets). One or more of the P-RNTIs and/or SI-RNTIs may have separate RNTIs. For example, the SI-RNTI and P-RNTI may be split into CEn-SI-RNTI and CEn-P-RNTI where n is the number of coverage enhancement levels. For example, in the example above, three coverage enhancement levels are able to be provided: 5 dB coverage enhancement, 10 dB coverage enhancement, and 15 dB coverage enhancement, leading to RNTIs of CE1-SI-RNTI/CE2-SI-RNTI/CE3-SI-RNTI and CE1-P-RNTI/CE2-P-RNTI/CE3-P-RNTI. In one example, CE3-P-RNTI corresponds to a hexadecimal value of FFF7, CE2-P-RNTI corresponds to a hexadecimal value of FFF8, CE1-P-RNTI corresponds to a hexadecimal value of FFF9, CE3-SI-RNTI corresponds to a hexadecimal value of FFFA, CE2-SI-RNTI corresponds to a hexadecimal value of FFFB, and CE1-P-RNTI corresponds to a hexadecimal value of FFFC, although other values may be used.

Similar to the above, in some embodiments, a MTC UE in a particular coverage enhanced mode may decode the appropriate PDCCH or EPDCCH (scrambled using the RNTI of the desired control signal), and the corresponding PDSCH in predefined time and frequency locations (MTC region). As above, the enhanced coverage mode MTC UE may have preprogrammed or otherwise indicated a predetermined set of resources (time and frequency locations) of a PDSCH that has been scrambled using the appropriate RNTI and thus not use the PDCCH when in enhanced (and perhaps normal) coverage mode operation.

In some embodiments, the number of RNTIs for each control signal is independent of the number of RNTIs for other control signals. Thus, in some embodiments the number of RNTIs may be the same between the different control signals while in other embodiments the number of RNTIs may differ between the different control signals. Moreover, the number of RNTIs may be independent of the number of enhanced coverage mode levels such that in various embodiments the number of RNTIs associated with a particular control signal may be from one RNTI to the same number of RNTIs as the number of enhanced coverage levels. Thus, one or more additional RNTIs associated with different enhanced coverage levels may be associated with a particular control signal, or no additional RNTIs associated with an enhanced coverage level may be associated with the particular control signal. For example, paging signals may only be scrambled using one paging RNTI for all enhanced coverage levels while SI signals may be scrambled with different SI RNTIs for each enhanced coverage level; or SI signals may only be scrambled using one SI RNTI for all enhanced coverage levels while paging signals may be scrambled with different paging RNTIs for each enhanced coverage level. In another example, paging signals may only be scrambled using one paging RNTI for all MTC UEs regardless of whether the MTC UEs are operating in a normal or enhanced coverage mode while SI signals may be scrambled with different SI RNTIs for each enhanced coverage level as well as a normal coverage mode SI RNTI; or a single SI RNTI may be shared among MTC UEs regardless of whether the MTC UEs are operating in a normal or enhanced coverage mode while paging signals may be scrambled with different paging RNTIs for each enhanced coverage level as well as a normal coverage mode paging RNTI.

Figure 4:
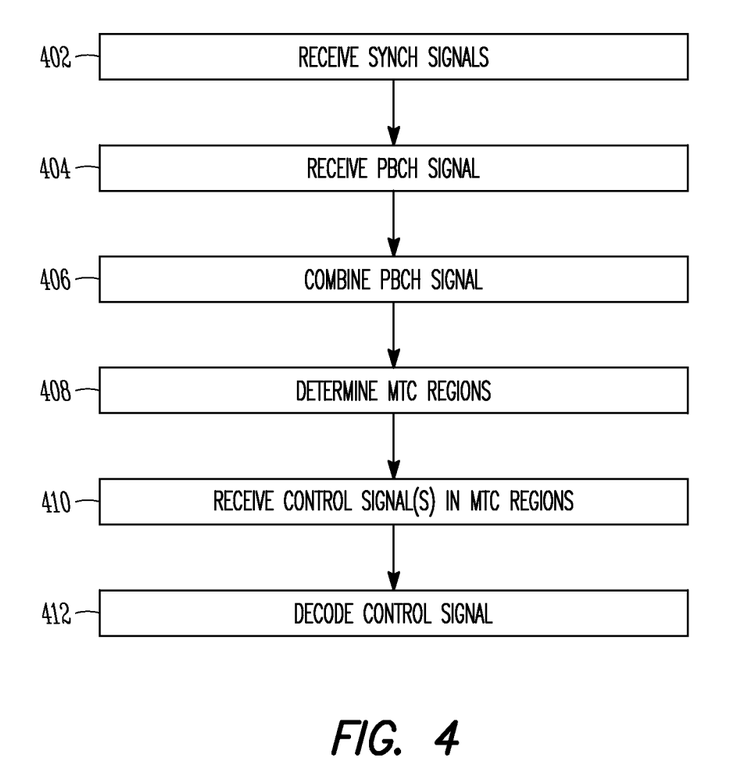
FIG. 4 illustrates a flowchart of a method of using an enhanced coverage mode in accordance with some embodiments.

FIG. 4 illustrates a flowchart of a method of using an enhanced coverage mode in accordance with some embodiments. In operation 402, the UE may receive a primary and/or secondary synchronization signal. The primary and secondary synchronization signals may be in the central 6 PRBs of the appropriate downlink subframe provided by the eNB. Transmissions from the eNB may occur over the entire range of the system bandwidth. Certain transmissions, such as those intended for MTC UEs or other normal UEs operating in an enhanced coverage mode may be limited to predetermined resource (frequency and time) regions such that at least the frequency range of the transmissions are limited, e.g., to 1.4 MHz. The resource regions may be multiplexed in frequency and/or time.

Using the synchronization signals, the UE may at operation 404 receive a PBCH signal in the corresponding downlink subframe. The PBCH may contain a number of resource regions directed to UEs in different modes, including a normal coverage mode and at least one enhanced coverage mode. The resource regions may have the same number of resource or may differ depending on the mode associated with the resource region. The PBCH may contain information in an MIB that provides specifics of the various resource regions, including the periodicity and occasion of the resource region. The PBCH may be transmitted in the central 6 PRBs.

Dependent on whether it is in normal mode or an enhancement mode, the UE may combine a number of PBCH signals at operation 406. The UE may combine the PBCH as well as the synchronization signals over extended periods of time when the UE is in one of the enhanced coverage modes to obtain a signal having a sufficient link budget to enable the UE to decode the signal. The UE may determine which enhanced coverage mode it is in based on a RSRP measurement and/or the amount of time spent combining the primary and secondary synchronization signals and/or PBCH signals to be combined to form a combined signal having the predetermined link budget. The PBCH may contain resource region information for both uplink and downlink communications.

Once the predetermined link budget has been reached, independent of whether the UE is in a normal coverage mode or an enhanced coverage mode, the UE may decode the PBCH and determine in operation 408 the appropriate resource region in which to receive a signal (as well as RNTI within the resource region). The resource region may provide data and/or control signals for the particular UE mode. The UEs in a normal mode may continue to read either the legacy SIB to obtain system information to access the network. The appropriate resource region to use may depend on the type of signal being received as well as the type of mode of the UE.

The UE may receive a control signal at operation 410. The control signal may be a paging signal or a SI signal. The control signal may be encoded using an RNTI that may be dependent on the type of control signal and/or the enhanced coverage mode. The RNTI may also be independent of the enhanced coverage mode such that the same RNTI is used for a particular control signal in all enhanced coverage modes while a different RNTI is used for UEs in a normal mode or the same RNTI may be used for the control signal independent of the mode. The control signal may also be encoded using at least one of the physical cell identification of the cell serving the MTC UE and an index of the MTC region in which the PDSCH is transmitted.

Once the control signal has been received and combined to form a control signal having the predetermined link budget, at step 412 the control signal is decoded by the UE. The UE may use the RNTI. In some embodiments, the UE may obtain the appropriate resource region through another mechanism (e.g., preprogrammed in the UE) and may not use the PBCH to determine whether or not to decode the PDSCH. The UE may then determine whether the control signal applies to it. For example, a paging signal transmitted by the eNB in the resource region intended for UEs in the same mode as a particular UE may not be paging the particular UE but still is to be decoded by the particular UE to determine whether the paging signal is for the particular UE. An SI signal, on the other hand, may apply equally to all UEs in the network and thus may be decoded by all UEs using different resource regions.

As described above the transmitter may combine multiple PBCH signals to form a combined PBCH signal of sufficient signal strength, which may then decoded by the receiver. In some embodiments, however, the transmitter may transmit PBCH signals on which the receiver may perform soft bit combining before decoding and refrain from combining the repeated PBCH signals to form the combined PBCH signal.

In some embodiments, the type of soft bit combining may be chase combining or incremental redundancy may be used. In chase combining the exact same information (e.g., data and parity bits) may be retransmitted in each PBCH signal. The received signals may be stored in a buffer and summed using maximum-ratio combining to provide the desired link budget. In incremental redundancy, every retransmission may contain different information. In particular, in incremental redundancy multiple sets of coded bits are generated each of which represents the same set of information bits and each transmission may use a different set of the coded bits with different redundancy versions. The redundancy version may be defined to improve decoding performance. In one embodiment, an indication of whether chase combining or incremental redundancy is being used may be predefined by specification and stored in a memory of the UE or may be configured by higher layer signaling (such as RRC signaling) transmitted to the UE. In addition, the redundancy version pattern for the incremental redundancy transmission may be predefined and stored in a memory of the UE or may be configured by higher layer signaling transmitted to the UE.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. User equipment (TIE) comprising:
a transceiver configured to transmit and receive signals from an enhanced Node B (eNB) in a network; and
processing circuitry configured to:
select among a normal coverage mode and one of a plurality of enhanced coverage (EC) modes in which to configure the UE, each of the plurality of EC modes is associated with a different coverage extension target;
configure the transceiver to receive at least one physical broadcast channel (PBCH) signal from the eNB, dependent on whether the UE is in the normal coverage mode or in one of the plurality of EC modes;
combine the at least one PBCH signal when the UE is in one of the plurality of EC modes; and
decode at least the at least one PBCH signal to determine a plurality of resource regions configured to be used by UEs in one of the EC modes, the plurality of resource regions comprising different sets of resource regions, each set of resource regions associated with UEs in a different EC mode,
wherein within a particular subframe, a number of resource regions associated with uplink EC transmissions is independent of a number of resource regions associated with downlink EC transmissions,
the resource regions associated with uplink EC transmissions and the resource regions associated with downlink EC transmissions are frequency multiplexed, and
the number of resource regions associated with uplink EC transmissions and the number of resource regions associated with downlink EC transmissions is configured to vary with at least one of deployment of UEs in one of the EC modes served by the eNB or application used by each of the UEs.

2. The UE of claim 1, wherein, in response to the processing circuitry configuring the UE to be in one of the plurality of EC modes, the processing circuitry is further configured to:
configure the transceiver to receive a plurality of synchronization signals of the same type in six central physical resource blocks, and synchronize to the eNB using the plurality of synchronization signals.

3. The UE of claim 1, wherein the processing circuitry is further configured to:
determine which of the plurality of EC modes the UE is in response to determining at least one of:
a number of synchronization signals transmitted by the eNB combined to form a combined synchronization signal having the predetermined link budget, a number of PBCH signals used to enable successful decoding of the at least one PBCH and a measurement of Reference Signal Received Power (RSRP).

4. The UE of claim 3, wherein the processing circuitry is further configured to:
configure the transceiver to receive at least one of:
the number of synchronization signals in at least one of six central physical resource blocks and the set of resource regions associated with the UE EC mode, and
the PBCH signals in the set of resource regions associated with the UE EC mode.

5. The UE of claim 3, wherein the processing circuitry is further configured to:
determine which set of resource regions to use based on the UE EC mode,
configure the transceiver to receive system information block signals in the set of resource regions associated with the UE EC mode, and
configure the transceiver to communicate with the eNB in both downlink and uplink transmissions using the set of resource regions.

6. The UE of claim 1, wherein the processing circuitry is further configured to:
configure the transceiver to receive at least one control signal, each control signal comprising a Radio Network Temporary Identifier (RNTI) that is dependent on a signal type of the control signal.

7. The UE of claim 6, wherein at least one of:
the RNTI is dependent on the EC mode, or
the at least one control signal comprises a paging signal and system information (SI) signal.

8. The UE of claim 1, wherein the processing circuitry is further configured to:
configure the transceiver to receive at least one of a paging signal and a system information block (SIB) signal in a Physical Downlink Shared Channel (PDSCH) in predefined resource regions, and
decode the at least one of the paging signal and the SIB free from decoding a physical downlink control channel (PHCCH) signal associated with the PDSCH.

9. The UE of claim 1, wherein the processing circuitry is further configured to:
configure the transceiver to receive at least one of a paging signal and a system information block (SIB) signal in a Physical Downlink Shared Channel (PDSCH) in predefined resource regions, and
decode the at least one of the paging signal and the SIB signal using a Radio Network Temporary Identifier (RNTI) that is dependent on a signal type of the signal.

10. The UE of claim 9, wherein at least one of:
the RNTI is dependent on the EC mode and a number of RNTIs available to encode a paging signal is independent of a number of RNTIs available to encode a system information block (SIB) signal, or
one of the at least one of the paging signal and the SIB signal uses an RNTI dependent on whether the LIE is in an EC mode and the other of the at least one of the paging signal and the SIB signal uses an RNTI of a UE in a normal coverage mode.

11. The UE of claim 1, wherein the processing circuitry is further configured to:
decode at least one of a physical downlink control channel (PDCCH) signal and a Physical Downlink Shared Channel (PDSCH) signal based on at least one of physical cell identifier of the eNB, Radio Network Temporary Identifier (RNTI) that is dependent on the EC mode and an index of the resource region.

12. The UE of claim 1, wherein the processing circuitry is further configured to:
configure the transceiver to receive at least one of a paging signal and a system information block (SIB) signal in a Physical Downlink Shared Channel (PDSCH) whose resource is indicated in a physical downlink control channel (PDCCH) signal associated with the PDSCH.

13. The UE of claim 1, further comprising an antenna configured to transmit and receive communications between the transceiver and the eNB.

14. An apparatus of an eNode B (eNB), the apparatus comprising:
an interface to communicate with at least one user equipment (UE); and
processing circuitry in communication with the interface and configured to:
determine whether the at least one LIE served by the eNB is operating in one of a plurality of enhanced coverage (EC) modes associated with a different coverage extension target;
allocate a plurality of different sets of resources for a signal in response to determining that multiple UEs are operating in different EC modes, each set of resources corresponding to a different one of the EC modes, each set of resources configured to form a combined signal of a predetermined link budget when combined at the UE; and
configure a transceiver to transmit the signal in the sets of resources,
wherein within a particular subframe, a number of resource regions associated with uplink EC transmissions is independent of a number of resource regions associated with downlink EC transmissions,
the resource regions associated with uplink EC transmissions and the resource regions associated with downlink EC transmissions are frequency multiplexed, and
the number of resource regions associated with uplink EC transmissions and the number of resource regions associated with downlink EC transmissions is configured to vary with at least one of deployment of UEs in one of the EC modes served by the eNB or application used by each of the UEs.

15. The apparatus of claim 14, wherein:
the signal is a physical broadcast channel (PBCH) signal, and the processing circuitry is further configured to configure the transceiver to transmit at least one of:
a plurality of synchronization signals of the same type in six central physical resource blocks and each set of resource regions, and
the PBCH signal in each set of resource regions.

16. The apparatus of claim 14, wherein:
the signal is a control signal, and the processing circuitry is further configured to scramble the control signal using different Radio Network Temporary Identifiers (RNTIs) dependent on a signal type of the control signal.

17. The apparatus of claim 16, wherein:
the RNTI is dependent on the EC mode.

18. The apparatus of claim 16, wherein:
the control signal comprises at least one of a paging signal and system information (SI) signal.

19. The apparatus of claim 14, wherein the processing circuitry is further configured to:

configure the transceiver to transmit to a particular UE at least one of a paging signal and a system information block (SIB) signal in a Physical Downlink Shared Channel (PDSCH) in predefined resource regions, and encode the at least one of the paging signal and the SIB signal using a Radio Network Temporary Identifier (RNTI) that is dependent on a signal type of the signal.

20. The apparatus of claim 19, wherein:
the RNTI is dependent on the EC mode.

21. The apparatus of claim 20, wherein:
a number of RNTIs available to encode the paging signal is independent of a number of RNTIs available to encode the SIB signal.

22. The apparatus of claim 19, wherein:
one of the at least one of the paging signal and the SIB signal uses an RNTI dependent on whether the particular UE is in an EC mode and the other of the at least one of the paging signal and the SIB signal uses an RNTI of a UE in a normal coverage mode.

23. The apparatus of claim 14, wherein the processing circuitry is further configured to:
configure the transceiver to transmit at least one of a paging signal and a system information block (SIB) signal in a Physical Downlink Shared Channel (PDSCH) whose resource is indicated in a physical downlink control channel (PDCCH) signal associated with the PDSCH.

24. A non-transitory computer-readable storage medium that stores instructions for execution by one or more processors of a user equipment (UE) to configure the UE to communicate with an enhanced Node B (eNB), the one or more processors to configure the UE to:
select among a normal coverage mode and an enhanced coverage (EC) mode in which to operate, the EC mode selected from a plurality of EC modes each associated with a different coverage extension target;
receive a signal from the eNB, the signal being received in a set of resource regions dependent on the mode in which the UE is operating; such that each set of resource regions is associated with a different mode, and scrambled using a Radio Network Temporary Identifiers (RNTI) dependent on at least one of a signal type of the signal and the mode in which the UE is operating;
combine the signal to form a combined signal when the UE is one of the plurality of EC modes to obtain a combined signal having a predetermined link budget; and
decode the combined signal using the RNTI,
wherein within a particular subframe, a number of resource regions associated with uplink EC transmissions is independent of a number of resource regions associated with downlink EC transmissions,
the resource regions associated with uplink EC transmissions and the resource regions associated with downlink EC transmissions are frequency multiplexed, and
the number of resource regions associated with uplink EC transmissions and the number of resource regions associated with downlink EC transmissions is configured to vary with at least one of deployment of UEs in one of the EC modes served by the eNB or application used by each of the UEs.

25. The non-transitory computer-readable storage medium of claim 24, wherein:
one of the at least one of the paging signal and the SIB signal uses an RNTI dependent on whether the particular UE is in an EC mode and the other of the at least one of the paging signal and the SIB signal uses an RNTI of a UE in a normal coverage mode.

26. The UE of claim 1, wherein:
at least one of the number of resource regions associated with uplink EC transmissions or the number of resource regions associated with downlink EC transmissions comprises a plurality of frequency multiplexed resource regions.

27. The UE of claim 1, wherein:
within a particular subframe, multiple frequency multiplexed resource regions are associated with EC transmissions, and
the processing circuitry is configured to randomly select among the multiple resource regions to communicate with the eNB.

* * * * *